United States Patent
Yin

(10) Patent No.: US 12,456,480 B2
(45) Date of Patent: Oct. 28, 2025

(54) VIDEO GENERATION METHOD, GENERATION MODEL TRAINING METHOD AND APPARATUS, AND MEDIUM AND DEVICE

(71) Applicant: BEIJING BYTEDANCE NETWORK TECHNOLOGY CO., LTD., Beijing (CN)

(72) Inventor: Xiang Yin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 325 days.

(21) Appl. No.: 18/000,387

(22) PCT Filed: Jul. 30, 2021

(86) PCT No.: PCT/CN2021/109460
§ 371 (c)(1),
(2) Date: Nov. 30, 2022

(87) PCT Pub. No.: WO2022/033327
PCT Pub. Date: Feb. 17, 2022

(65) Prior Publication Data
US 2023/0223010 A1    Jul. 13, 2023

(30) Foreign Application Priority Data
Aug. 12, 2020   (CN) .......................... 202010807940.7

(51) Int. Cl.
*G10L 21/10*   (2013.01)
*G06N 3/0455*   (2023.01)
(Continued)

(52) U.S. Cl.
CPC ............ *G10L 21/10* (2013.01); *G06N 3/0455* (2023.01); *G06N 3/0475* (2023.01); *G10L 15/02* (2013.01);
(Continued)

(58) Field of Classification Search
CPC .......... G10L 25/57; G10L 21/06; G10L 21/10
See application file for complete search history.

(56) References Cited

U.S. PATENT DOCUMENTS

| 7,133,535 B2 * | 11/2006 | Huang | G06V 40/20 |
| | | | 704/E21.02 |
| 2010/0082345 A1 * | 4/2010 | Wang | G10L 13/00 |
| | | | 704/E21.02 |

(Continued)

FOREIGN PATENT DOCUMENTS

| CN | 107610717 A | 1/2018 |
| CN | 109493846 A | 3/2019 |

(Continued)

OTHER PUBLICATIONS

Duarte, Amanda Cardoso, et al. "WAV2PIX: Speech-conditioned Face Generation using Generative Adversarial Networks." ICASSP. vol. 2019. 2019. (Year: 2019).*

(Continued)

*Primary Examiner* — Shaun Roberts

(57) ABSTRACT

Provided are a video generation method and apparatus, a generation model training method and apparatus, a medium and a device. The method includes: acquiring target audio data to be synthesized; extracting an acoustic feature of the target audio data as a target acoustic feature; determining phonetic posteriorgrams (PPG) corresponding to the target audio data according to the target acoustic feature and generating an image sequence corresponding to the target audio data according to the PPG; and performing a video synthesis on the target audio data and the image sequence (Continued)

corresponding to the target audio data to obtain target video data.

12 Claims, 4 Drawing Sheets

(51) Int. Cl.
  *G06N 3/0475* (2023.01)
  *G10L 15/02* (2006.01)
  *G10L 15/06* (2013.01)
  *G10L 15/16* (2006.01)
  *G10L 21/06* (2013.01)
  *G10L 25/57* (2013.01)

(52) U.S. Cl.
  CPC ............ *G10L 15/063* (2013.01); *G10L 15/16* (2013.01); *G10L 21/06* (2013.01); *G10L 25/57* (2013.01); *G10L 2015/025* (2013.01)

(56) References Cited

U.S. PATENT DOCUMENTS

| | | | | |
|---|---|---|---|---|
| 2015/0098603 | A1* | 4/2015 | Kulavik | G06F 3/162 |
| | | | | 381/370 |
| 2018/0012613 | A1* | 1/2018 | Sun | G10L 25/24 |
| 2020/0117887 | A1* | 4/2020 | Chaudhuri | G10L 25/78 |
| 2020/0193961 | A1* | 6/2020 | Kim | G10L 13/08 |
| 2020/0302667 | A1* | 9/2020 | del Val Santos | G06N 3/044 |
| 2021/0375023 | A1* | 12/2021 | Kothari | G06N 3/044 |
| 2021/0390748 | A1* | 12/2021 | Liao | G06V 10/82 |
| 2022/0358703 | A1* | 11/2022 | Chae | G06T 13/205 |
| 2023/0343010 | A1* | 10/2023 | Kwatra | G10L 21/10 |

FOREIGN PATENT DOCUMENTS

| | | |
|---|---|---|
| CN | 110503942 A | 11/2019 |
| CN | 110728203 A | 1/2020 |
| CN | 110880315 A | 3/2020 |
| CN | 110930981 A | 3/2020 |
| CN | 111292720 A | 6/2020 |
| CN | 111429894 A | 7/2020 |
| CN | 111933110 A | 11/2020 |
| CN | 113079327 A | 7/2021 |
| WO | WO2018/077244 A1 | 5/2018 |

OTHER PUBLICATIONS

Greenwood, David, Stephen Laycock, and Iain Matthews. "Predicting head pose from speech with a conditional variational autoencoder." ISCA, 2017. (Year: 2017).*
Search Report mailed Oct. 14, 2021 for PCT Application No. PCT/CN2021/109460, English Translation (4 pages).
First Office Action mailed Jun. 3, 2021 in CN Application 202010807940.7, English Translation (24 pages).
Written Opinion for International Application No. PCT/CN2021/109460, mailed Oct. 14, 2021, 12 Pages.

* cited by examiner

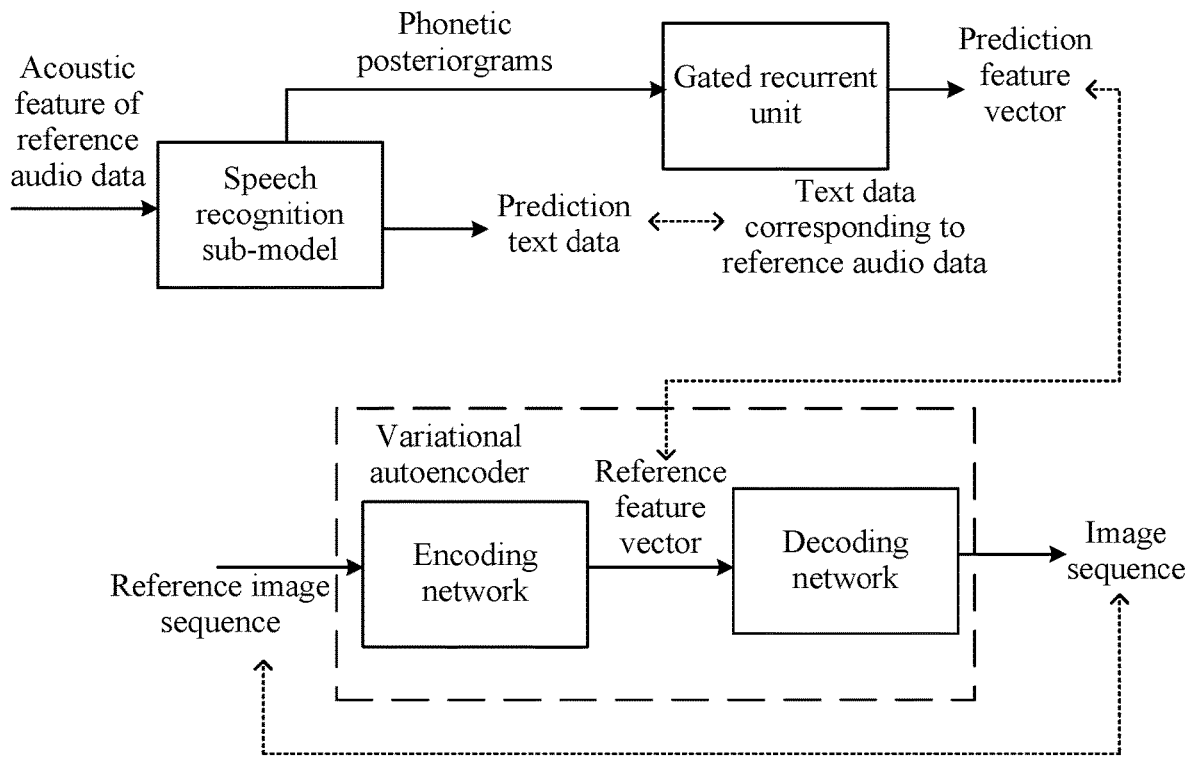

FIG. 3

Acquire reference video data, where the reference video data includes reference audio data, a reference image sequence and text data corresponding to the reference audio data ~S401

Perform model training by using an acoustic feature of the reference audio data as an input of the speech recognition sub-model, using the text data corresponding to the reference audio data as a target output of the speech recognition sub-model, using the reference image sequence as an input of the encoding network, using the reference image sequence as a target output of the decoding network, using PPG corresponding to the reference audio data determined by the speech recognition sub-model according to the acoustic feature of the reference audio data as an input of the GRU and using an output of the encoding network as a target output of the GRU to obtain the image generation model ~S402

FIG. 4

VIDEO GENERATION METHOD, GENERATION MODEL TRAINING METHOD AND APPARATUS, AND MEDIUM AND DEVICE

CROSS-REFERENCE TO RELATED APPLICATIONS

This is a National Stage Application filed under 35 U.S.C. 371 based on International Patent Application No. PCT/CN2021/109460, filed on Jul. 30, 2021, which claims priority to Chinese Patent Application No. 202010807940.7 filed on Aug. 12, 2020, the disclosures of both of which are incorporated herein by reference in their entireties.

TECHNICAL FIELD

The present disclosure relates to the field of data processing, for example, a video generation method, a generation model training method and apparatus, a medium and a device.

BACKGROUND

At present, a speech-to-video generation technology is becoming a research hotspot. For example, for a piece of speech of any speaker, a virtual image may be driven to make a head motion and a body posture corresponding to the piece of speech, so as to bring an immersive experience to a user. An implementation is to extract an acoustic feature (such as a mel-frequency cepstral coefficient (MFCC)) in the speech, then generate an image sequence directly through an image model according to the acoustic feature and finally synthesize the image sequence and the speech into a video. However, since the extracted acoustic feature contains information related to the speaker, the image model thus established can only generate the image sequence according to the speech of the specific speaker.

SUMMARY

In a first aspect, the present disclosure provides a video generation method. The method includes the steps described below.

Target audio data to be synthesized is acquired.

An acoustic feature of the target audio data is extracted as a target acoustic feature.

Phonetic posteriorgrams (PPG) corresponding to the target audio data is determined according to the target acoustic feature, and an image sequence corresponding to the target audio data is generated according to the PPG, where the PPG is used to characterize a distribution probability of a phoneme to which each audio frame in the target audio data belongs.

A video synthesis is performed on the target audio data and the image sequence corresponding to the target audio data to obtain target video data.

In a second aspect, the present disclosure provides a training method for an image generation model, where the image generation model includes a speech recognition sub-model, a gated recurrent unit (GRU) and a variational autoencoder (VAE), where the VAE includes an encoding network and a decoding network.

The method includes the steps described below.

Reference video data is acquired, where the reference video data includes reference audio data, a reference image sequence and text data corresponding to the reference audio data.

Model training is performed in such a manner that an acoustic feature of the reference audio data is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

In a third aspect, the present disclosure provides a video generation apparatus. The apparatus includes a first acquisition module, an extraction module, a determination module and a synthesis module.

The first acquisition module is configured to acquire target audio data to be synthesized.

The extraction module is configured to extract an acoustic feature of the target audio data acquired by the first acquisition module as a target acoustic feature.

The determination module is configured to determine PPG corresponding to the target audio data according to the target acoustic feature extracted by the extraction module and generate an image sequence corresponding to the target audio data according to the PPG, where the PPG is used to characterize a distribution probability of a phoneme to which each audio frame in the audio data belongs.

The synthesis module is configured to perform a video synthesis on the target audio data acquired by the first acquisition module and the image sequence corresponding to the target audio data determined by the determination module to obtain target video data.

In a fourth aspect, the present disclosure provides an image generation model training apparatus, where the image generation model includes a speech recognition sub-model, a GRU and a VAE, wherein the VAE includes an encoding network and a decoding network.

The apparatus includes a second acquisition module and a training module.

The second acquisition module is configured to acquire reference video data, where the reference video data includes reference audio data, a reference image sequence and text data corresponding to the reference audio data.

The training module is configured to perform model training in such a manner that an acoustic feature of the reference audio data acquired by the second acquisition module is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

In a fifth aspect, the present disclosure provides a non-transitory computer-readable medium, which is configured to store a computer program which, when executed by a processing apparatus, implements the video generation method according to the first aspect of the present disclosure or the training method for an image generation model according to the second aspect of the present disclosure.

In a sixth aspect, the present disclosure provides an electronic device. The device includes a storage apparatus and a processing apparatus.

The storage apparatus is configured to store a computer program.

The processing apparatus is configured to execute the computer program in the storage apparatus to implement the video generation method according to the first aspect of the present disclosure.

In a seventh aspect, the present disclosure provides an electronic device. The device includes a storage apparatus and a processing apparatus.

The storage apparatus is configured to store a computer program.

The processing apparatus is configured to execute the computer program in the storage apparatus to implement the training method for an image generation model according to the second aspect of the present disclosure.

BRIEF DESCRIPTION OF DRAWINGS

FIG. 3 is a block diagram of an image generation model according to an example embodiment.

FIG. 4 is a flowchart of a training method for an image generation model according to an example embodiment.

DETAILED DESCRIPTION

Figure 1:
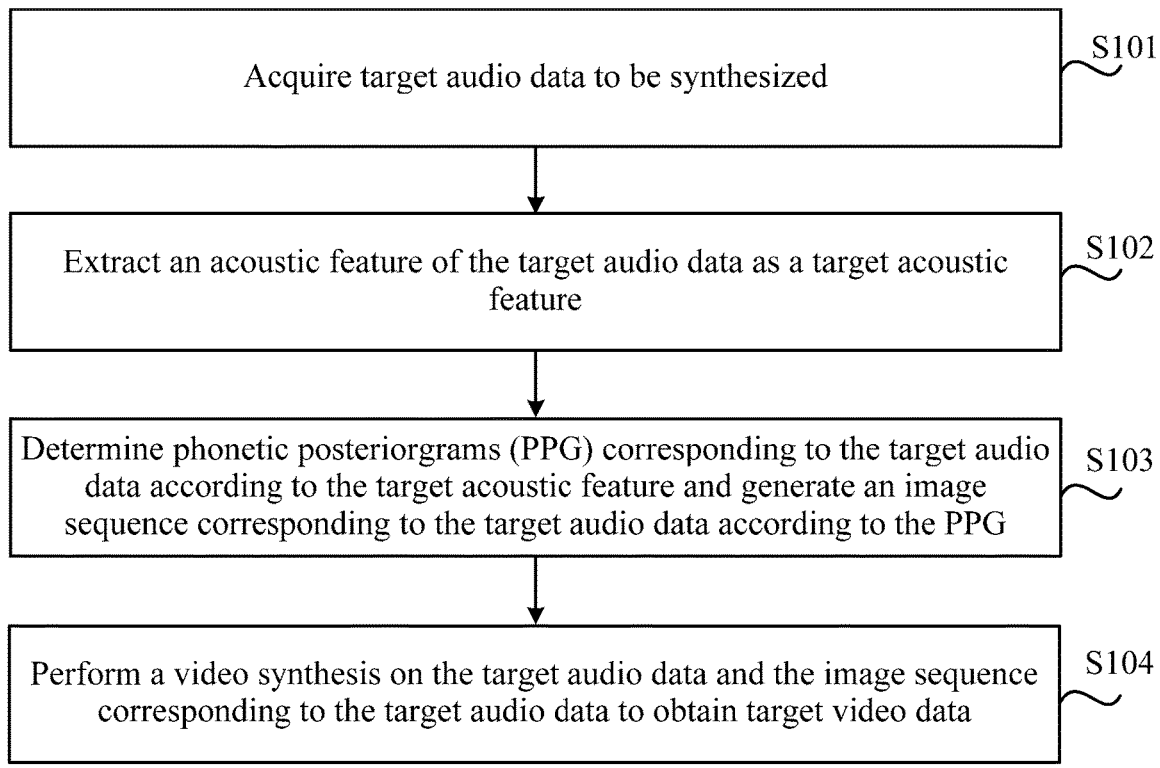
FIG. 1 is a flowchart of a video generation method according to an example embodiment.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that drawings and embodiments of the present disclosure are merely illustrative and are not intended to limit the scope of the present disclosure.

It is to be understood that the various steps recorded in the method embodiments of the present disclosure may be performed in a different order, and/or in parallel. In addition, the method embodiments may include additional steps and/or omit performing the illustrated steps. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that references to modifications of "one" or "a plurality" mentioned in the present disclosure are intended to be illustrative and not limiting; those skilled in the art should understand that "one" or "a plurality" should be understood as "at least one" unless clearly expressed in the context.

The names of messages or information exchanged between multiple apparatuses in embodiments of the present disclosure are only for illustrative purposes and are not intended to limit the scope of such messages or information.

FIG. 1 is a flowchart of a video generation method according to an example embodiment. As shown in FIG. 1, the method may include S101 to S104.

In S101, target audio data to be synthesized is acquired.

In the present disclosure, the target audio data to be synthesized may be an audio corresponding to any speaker, that is, a speech uttered by any speaker. Moreover, the target audio data may be an audio corresponding to a speaker's speaking, or may be an audio corresponding to a speaker's singing. In addition, a language of the target audio data is also not specifically limited in the present disclosure and may be, for example, Chinese, English or the like.

In S102, an acoustic feature of the target audio data is extracted as a target acoustic feature.

In the present disclosure, the acoustic feature may be an MFCC, a mel-scale filter bank (FBank), a linear predictive cepstral coefficient (LPCC), a cepstral coefficient, a perceptual linear predictive (PLP) coefficient, an amplitude of a fast Fourier transform (FFT) or the like.

The acoustic feature may be acquired using at least one acoustic feature extraction algorithm. For example, an exemplary calculation method of MFCC may be as follows: first, a time domain signal is converted into a frequency domain using the FFT; then, convolution is performed on a logarithmic energy spectrum of the frequency domain using a triangle filter bank distributed according to a mel-scale; and finally, a discrete cosine transform is performed on a vector composed of outputs of multiple filters, and first N coefficients are taken as MFCCs. An exemplary calculation method of FBank may be consistent with that of MFCC, and multiple filters are output as the FBank. An exemplary calculation method of LPCC may be as follows: a mean squared error between a sample value of the target audio data and a linear predictive sample value is minimized to obtain the LPCC. An exemplary calculation method of cepstral coefficient may be as follows: using a homomorphic processing method, after a discrete Fourier transform is performed on a signal of the target audio data, a logarithm is taken, and an inverse transform is performed to obtain the cepstral coefficient. An exemplary calculation method of PLP may be as follows: a parameter of a linear predictive coefficient is calculated using a Durbin method, and when an autocorrelation parameter is calculated, a discrete cosine transform is performed using a logarithmic energy spectrum which excites a hearing so that the PLP is obtained. An exemplary calculation method of amplitude of FFT may be as follows: a feature of the amplitude of the FFT of the target audio data is extracted using an FFT algorithm.

In S103, phonetic posteriorgrams (PPG) corresponding to the target audio data is determined according to the target acoustic feature, and an image sequence corresponding to the target audio data is generated according to the PPG.

In the present disclosure, the PPG is used to characterize a distribution probability of a phoneme to which each audio frame in the audio data belongs, that is, a probability distribution of a phoneme to which a content of the audio frame belongs.

In S104, a video synthesis is performed on the target audio data and the image sequence corresponding to the target audio data to obtain target video data.

In the present disclosure, based on a timestamp corresponding to each audio frame in the target audio data and a timestamp corresponding to each image frame in the corresponding image sequence, the audio frame and the image frame may be synthesized to obtain the target video data.

In the above technical solution, after the acoustic feature of the target audio data to be synthesized is extracted, the PPG corresponding to the target audio data may be determined according to the acoustic feature, and the image sequence corresponding to the target audio data may be generated according to the PPG; then, the video synthesis is performed on the target audio data and the corresponding image sequence to obtain the target video data. Since the PPG is information irrelevant to an actual speaker, effects of factors such as pronunciation habits (accents) of different speakers and noises on the subsequently generated image sequence may be avoided, improving the accuracy of a head motion and a body posture in the generated image sequence. Further, for speech data of any speaker, a corresponding image sequence may be generated to obtain video data.

The following describes a specific embodiment of the above S103 in detail, where the PPG corresponding to the target audio data is determined according to the target acoustic feature, and the image sequence corresponding to the target audio data is generated according to the PPG.

In an embodiment, the target acoustic feature may be input into an automatic speech recognition (ASR) model to obtain the PPG corresponding to the target audio data; then, the PPG is input into a pre-trained recurrent neural network (RNN) to obtain action features (including the head motion and the body posture) corresponding to the target audio data, where during the training, the RNN is used for learning a mapping relationship between the PPG and the action features; and finally, the action features generated by the RNN are synthesized into the image sequence through techniques such as an alignment of head and body, an image fusion and an optical flow method.

In another embodiment, the target acoustic feature is input into an image generation model so that the PPG corresponding to the target audio data is determined by the image generation model according to the target acoustic feature, and the image sequence corresponding to the target audio data is generated according to the PPG corresponding to the target audio data. In this manner, the target acoustic feature is input into the image generation model so that the image sequence corresponding to the target audio data may be directly generated, which is convenient and quick.

Figure 2:
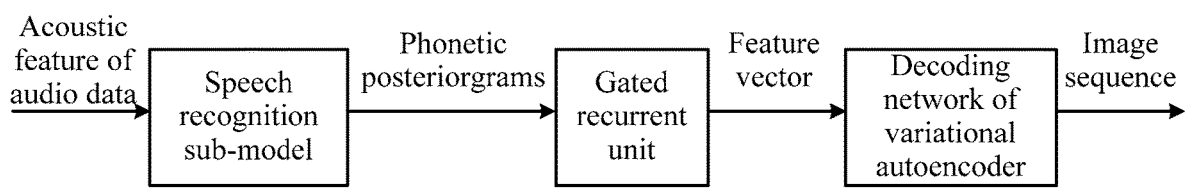
FIG. 2 is a schematic diagram of a process of generating an image sequence according to an example embodiment.

For example, as shown in FIG. 2, the image generation model includes a speech recognition sub-model, a gated recurrent unit (GRU) and a decoding network of a variational autoencoder (VAE) connected in sequence.

The speech recognition sub-model is configured to determine the PPG of the audio data according to the input acoustic feature of the audio data. For example, the speech recognition sub-model may be a feedforward neural network (FNN) model, a Gaussian mixture model-hidden Markov model (GMM-HMM), a deep neural network-hidden Markov model (DNN-HMM) or the like.

The GRU is configured to determine a feature vector according to the input PPG.

The decoding network of the VAE is configured to generate the image sequence corresponding to the audio data according to the feature vector. That is, the decoding network of the VAE decodes the feature vector to obtain the image sequence corresponding to the audio data.

The above training method for the image generation model is described in detail below. As shown in FIG. 3, the image generation model further includes an encoding network of the VAE. For example, the image generation model may be obtained through training according to S401 and S402 shown in FIG. 4.

In S401, reference video data is acquired, where the reference video data includes reference audio data, a reference image sequence and text data corresponding to the reference audio data.

In the present disclosure, the text data corresponding to the reference audio data may be subtitle data in a reference video, or may be text data obtained through manually labeling according to the reference audio data. In addition, a large number of video data of the same speaker may be used as the reference video data to train the image generation model so that a virtual image in the image sequence generated by the trained image generation model is an image of the speaker.

In S402, model training is performed in such a manner that an acoustic feature of the reference audio data is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

In the present disclosure, for the speech recognition sub-model, as shown in FIG. 3, the acoustic feature of the reference audio data is input into the speech recognition sub-model, and prediction text data corresponding to the reference audio data may be obtained; then, a model parameter of the speech recognition sub-model may be updated according to a comparison result of the prediction text data and the target output (the text data corresponding to the reference audio data) of the speech recognition sub-model.

For the VAE, the reference image sequence may be input into the encoding network of the VAE to perform feature extraction on the reference image sequence through the encoding network, and resampling is performed to form a new feature, that is, a reference feature vector corresponding to the reference image sequence; then, the reference feature vector is input into the decoding network of the VAE to decode the reference feature vector through the decoding network to obtain a corresponding image sequence; then, a model parameter of the VAE may be updated according to a comparison result of the image sequence output by the decoding network and the target output (the reference image sequence) of the decoding network.

For the GRU, the above speech recognition sub-model may determine the PPG corresponding to the reference audio data according to the acoustic feature of the reference audio data; then, the PPG may be input into the GRU to obtain a prediction feature vector; then, a model parameter of the GRU may be updated according to a comparison result of the prediction feature vector and the target output (the reference feature vector output by the encoding network) of the GRU.

In this manner, the image generation model may be obtained.

Figure 5:
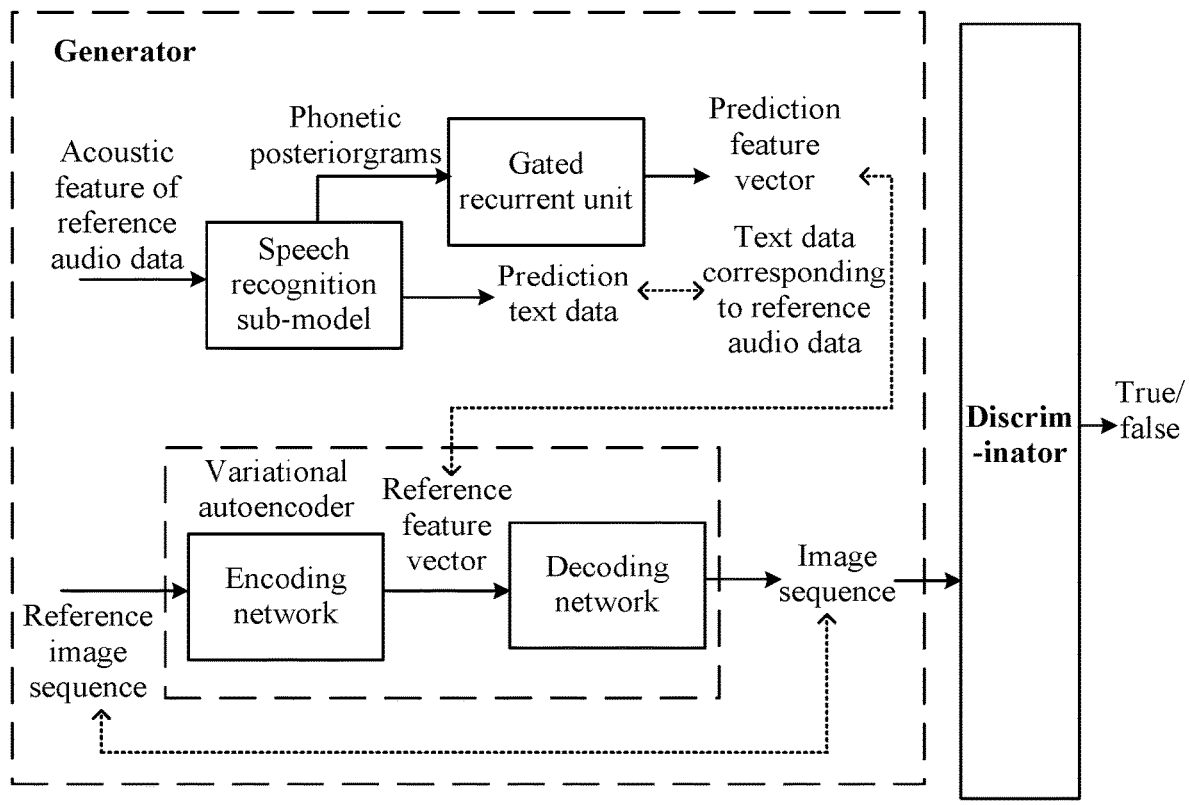
FIG. 5 is a block diagram of an image generation model according to another example embodiment.

As shown in FIG. 5, the above image generation model may further include a discriminator, and the image generation model is a generative adversarial network including a generator and the discriminator, where the generator includes the speech recognition sub-model, the GRU, the decoding network of the VAE and the encoding network of the VAE. The discriminator is configured to perform a true-false determination on the image sequence output by the decoding network at a model training stage, that is, determine whether the image sequence is a real image sequence, where an obtained true-false determination result is used to update a model parameter of the generator and a model parameter of the discriminator.

Through adversarial training of the discriminator and the generator, adjacent two frames of images in an image sequence generated by the generator may be more similar to each other, ensuring the continuity of the image sequence. Moreover, the generated image sequence is closer to an image sequence of a real video, that is, more natural, improving the continuity and naturalness of a subsequently synthesized video.

The present disclosure further provides a training method for an image generation model. As shown in FIG. 3, the image generation model includes a speech recognition sub-model, a GRU and a VAE, where the VAE includes an encoding network and a decoding network. As shown in FIG. 4, the training method includes S401 and S402.

In S401, reference video data is acquired, where the reference video data includes reference audio data, a reference image sequence and text data corresponding to the reference audio data.

In the present disclosure, the text data corresponding to the reference audio data may be subtitle data in a reference video, or may be text data obtained through manually labeling according to the reference audio data. In addition, a large number of video data of the same speaker may be used as the reference video data to train the image generation model so that a virtual image in the image sequence generated by the trained image generation model is an image of the speaker.

In S402, model training is performed in such a manner that an acoustic feature of the reference audio data is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

In the present disclosure, for the speech recognition sub-model, as shown in FIG. 3, the acoustic feature of the reference audio data is input into the speech recognition sub-model, and prediction text data corresponding to the reference audio data may be obtained; then, a model parameter of the speech recognition sub-model may be updated according to a comparison result of the prediction text data and the target output (the text data corresponding to the reference audio data) of the speech recognition sub-model.

For the VAE, the reference image sequence may be input into the encoding network of the VAE to perform feature extraction on the reference image sequence through the encoding network, and resampling is performed to form a new feature, that is, a reference feature vector corresponding to the reference image sequence; then, the reference feature vector is input into the decoding network of the VAE to decode the reference feature vector through the decoding network to obtain a corresponding image sequence; then, a model parameter of the VAE may be updated according to a comparison result of the image sequence output by the decoding network and the target output (the reference image sequence) of the decoding network.

For the GRU, the above speech recognition sub-model may determine the PPG corresponding to the reference audio data according to the acoustic feature of the reference audio data; then, the PPG may be input into the GRU to obtain a prediction feature vector; then, a model parameter of the GRU may be updated according to a comparison result of the prediction feature vector and the target output (the reference feature vector output by the encoding network) of the GRU.

In this manner, the image generation model may be obtained.

As shown in FIG. 5, the above image generation model may further include a discriminator, and the image generation model is a generative adversarial network including a generator and the discriminator, where the generator includes the speech recognition sub-model, the GRU, the decoding network of the VAE and the encoding network of the VAE.

The above training method further includes the following steps: the decoding network inputs the obtained image sequence into the discriminator; the discriminator performs a true-false determination on the image sequence obtained by the decoding network, that is, determines whether the image sequence is a real image sequence; and a model parameter of the generator and a model parameter of the discriminator are updated using an obtained true-false determination result.

Through adversarial training of the discriminator and the generator, adjacent two frames of images in an image sequence generated by the generator may be more similar to each other, ensuring the continuity of the image sequence. Moreover, the generated image sequence is closer to an image sequence of a real video, that is, more natural, improving the continuity and naturalness of a subsequently synthesized video.

Figure 6:
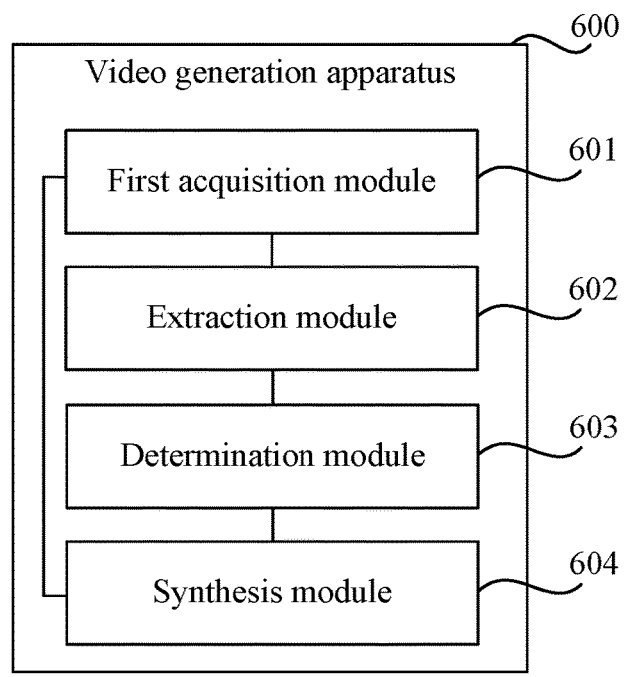
FIG. 6 is a block diagram of a video generation apparatus according to an example embodiment.

FIG. 6 is a block diagram of a video generation apparatus according to an example embodiment. As shown in FIG. 6, an apparatus 600 includes a first acquisition module 601, an extraction module 602, a determination module 603 and a synthesis module 604. The first acquisition module 601 is configured to acquire target audio data to be synthesized. The extraction module 602 is configured to extract an acoustic feature of the target audio data acquired by the first acquisition module 601 as a target acoustic feature. The determination module 603 is configured to determine PPG corresponding to the target audio data according to the target acoustic feature extracted by the extraction module 602 and generate an image sequence corresponding to the target audio data according to the PPG, where the PPG is used to characterize a distribution probability of a phoneme to which each audio frame in the audio data belongs. The synthesis module 604 is configured to perform a video synthesis on the target audio data acquired by the first acquisition module 601 and the image sequence corresponding to the target audio data determined by the determination module 603 to obtain target video data.

In the present disclosure, the target audio data to be synthesized may be an audio corresponding to any speaker, that is, a speech uttered by any speaker. Moreover, the target audio data may be an audio corresponding to a speaker's speaking, or may be an audio corresponding to a speaker's singing. In addition, a language of the target audio data is also not specifically limited in the present disclosure. The PPG is used to characterize a distribution probability of a phoneme to which each audio frame in the audio data belongs, that is, a probability distribution of a phoneme to which a content of the audio frame belongs.

In the above technical solution, after the acoustic feature of the target audio data to be synthesized is extracted, the PPG corresponding to the target audio data may be determined according to the acoustic feature, and the image sequence corresponding to the target audio data may be generated according to the PPG; then, the video synthesis is performed on the target audio data and the corresponding image sequence to obtain the target video data. Since the PPG is information irrelevant to an actual speaker, effects of factors such as pronunciation habits (accents) of different speakers and noises on the subsequently generated image sequence may be avoided, improving the accuracy of a head motion and a body posture in the generated image sequence. Further, for speech data of any speaker, a corresponding image sequence may be generated to obtain video data.

The following describes an embodiment in detail, where the determination module 603 determines the PPG corresponding to the target audio data according to the target acoustic feature and generates the image sequence corresponding to the target audio data according to the PPG.

In an embodiment, the determination module 603 includes a determination sub-module, a feature extraction sub-module and a synthesis sub-module. The determination sub-module is configured to input the target acoustic feature into an ASR model to obtain the PPG corresponding to the target audio data. The feature extraction sub-module is configured to input the PPG into a pre-trained RNN to obtain action features (including the head motion and the body posture) corresponding to the target audio data, where during the training, the RNN is used for learning a mapping relationship between the PPG and the action features. The synthesis sub-module is configured to synthesize the action features generated by the RNN into the image sequence through techniques such as an alignment of head and body, an image fusion and an optical flow method.

In another embodiment, the determination module 603 is configured to input the target acoustic feature into an image generation model so that the PPG corresponding to the target audio data is determined by the image generation model according to the target acoustic feature, and the image sequence corresponding to the target audio data is generated according to the PPG corresponding to the target audio data. In this manner, the target acoustic feature is input into the image generation model so that the image sequence corresponding to the target audio data may be directly generated, which is convenient and quick.

Optionally, the image generation model includes a speech recognition sub-model, a GRU and a decoding network of a VAE connected in sequence. The speech recognition sub-model is configured to determine the PPG of the audio data according to the input acoustic feature of the audio data. The GRU is configured to determine a feature vector according to the input PPG. The decoding network is configured to generate the image sequence corresponding to the audio data according to the feature vector.

Figure 7:
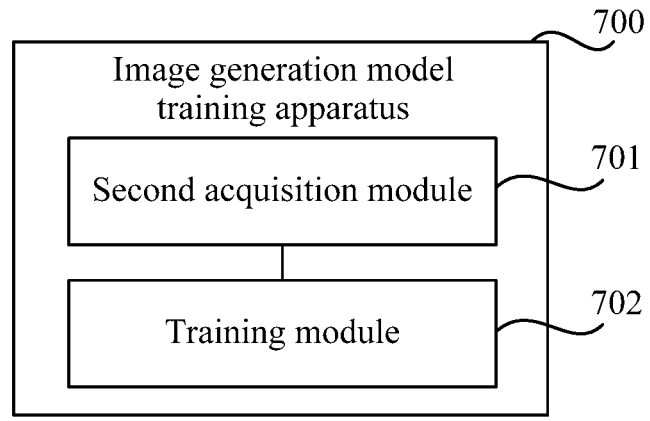
FIG. 7 is a block diagram of an image generation model training apparatus according to an example embodiment.

Optionally, the image generation model further includes an encoding network of the VAE and may be obtained through training of an image generation model training apparatus. As shown in FIG. 7, a training apparatus 700 includes a second acquisition module 701 and a training module 702. The second acquisition module 701 is configured to acquire reference video data, where the reference video data includes reference audio data, a reference image sequence and text data corresponding to the reference audio data. The training module 702 is configured to perform model training in such a manner that an acoustic feature of the reference audio data acquired by the second acquisition module 701 is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

Optionally, the image generation model further includes a discriminator, and the image generation model is a generative adversarial network including a generator and the discriminator, where the generator includes the speech recognition sub-model, the GRU, the decoding network and the encoding network. The discriminator is configured to perform a true-false determination on the image sequence output by the decoding network at a model training stage, where an obtained true-false determination result is used to update a model parameter of the generator and a model parameter of the discriminator.

The present disclosure further provides an image generation model training apparatus, where the image generation model includes a speech recognition sub-model, a GRU and a VAE, where the VAE includes an encoding network and a decoding network. As shown in FIG. 7, an apparatus 700 includes a second acquisition module 701 and a training module 702. The second acquisition module 701 is configured to acquire reference video data, where the reference video data includes reference audio data, a reference image sequence and text data corresponding to the reference audio data. The training module 702 is configured to perform model training in such a manner that an acoustic feature of the reference audio data acquired by the second acquisition module 701 is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

In the present disclosure, the text data corresponding to the reference audio data may be subtitle data in a reference video, or may be text data obtained through manually labeling according to the reference audio data.

Optionally, the image generation model further includes a discriminator, and the image generation model is a generative adversarial network including a generator and the discriminator, where the generator includes the speech recognition sub-model, the GRU and the VAE. The apparatus 700 further includes an input module, a determination module and an update module. The input module is configured to input the obtained image sequence into the discriminator through the decoding network. The determination module is configured to perform a true-false determination on the image sequence obtained by the decoding network through the discriminator. The update module is configured to update a model parameter of the generator and a model parameter of the discriminator using an obtained true-false determination result.

In addition, it is to be noted that the above image generation model training apparatus 700 may be integrated into the video generation apparatus 600, or may be independent of the video generation apparatus 600, and is not limited in the present disclosure. In addition, as for the apparatus in the preceding embodiments, the manner of the execution operation of each module has been described in detail in the embodiments of the method, which will not be described in detail herein.

Figure 8:
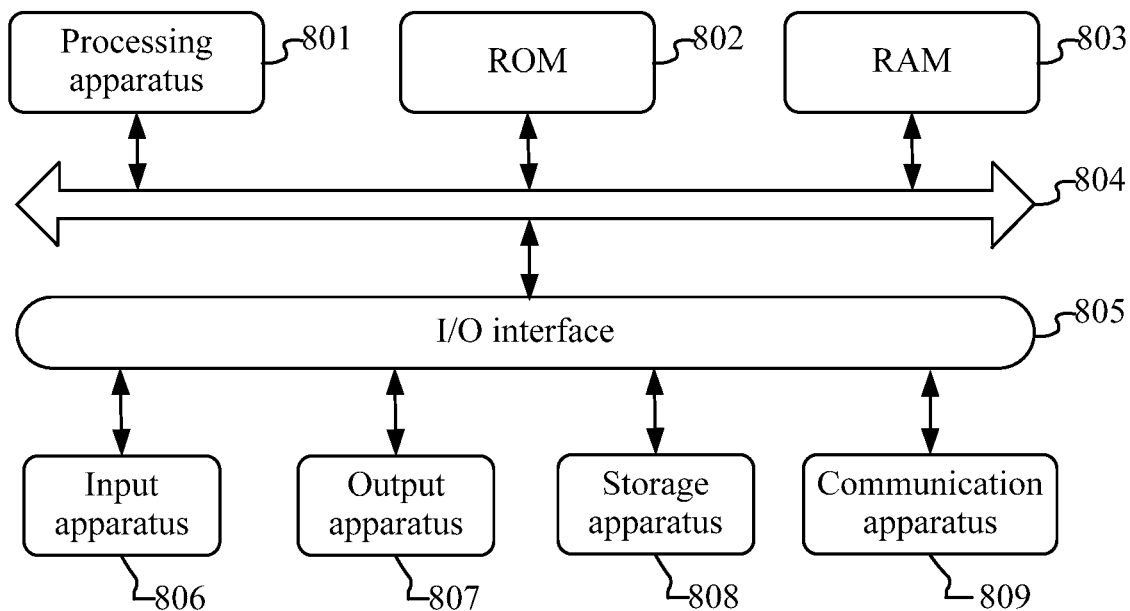
FIG. 8 is a block diagram of an electronic device according to an example embodiment.

Referring to FIG. 8, FIG. 8 shows a structure diagram of an electronic device (such as the terminal device or server in FIG. 8) 800 applicable to implementing the embodiments of the present disclosure. The terminal device in the embodiment of the present disclosure may include, but is not limited to, mobile terminals such as a mobile phone, a laptop, a digital broadcast receiver, a personal digital assistant (PDA), a portable android device (PAD), a portable media player (PMP) and an in-vehicle terminal (such as an in-vehicle navigation terminal), and stationary terminals such as a digital television (TV) and a desktop computer. The electronic device shown in FIG. 8 is merely an example and is not intended to limit the function and usage scope of the embodiments of the present disclosure.

As shown in FIG. 8, the electronic device 800 may include a processing apparatus 801 (such as a central processing unit and a graphics processing unit). The processing apparatus 801 may execute various types of appropriate operations and processing based on a program stored in a read-only memory (ROM) 802 or a program loaded from a storage apparatus 808 to a random-access memory (RAM) 803. Various programs and data required for the operation of the electronic device 800 are also stored in the RAM 803. The processing apparatus 801, the ROM 802 and the RAM 803 are connected to each other through a bus 804. An input/output (I/O) interface 805 is also connected to the bus 804.

Generally, the following apparatuses may be connected to the I/O interface 805: an input apparatus 806 such as a touch screen, a touch pad, a keyboard, a mouse, a camera, a microphone, an accelerometer and a gyroscope; an output apparatus 807 such as a liquid crystal display (LCD), a speaker and a vibrator; the storage apparatus 808 such as a magnetic tape and a hard disk; and a communication apparatus 809. The communication apparatus 809 may allow the electronic device 800 to perform wireless or wired communication with other devices to exchange data. Although FIG. 8 illustrates the electronic device 800 having various apparatuses, it is to be understood that not all of the apparatuses illustrated herein need to be implemented or present. Alternatively, more or fewer apparatuses may be implemented or present.

Particularly, according to the embodiments of the present disclosure, the process described above with reference to a flowchart may be implemented as a computer software program. For example, a computer program product is included in the embodiments of the present disclosure. The computer program product includes a computer program carried in a non-transitory computer-readable medium. The computer program includes program codes for executing the method shown in the flowchart. In such an embodiment, the computer program may be downloaded from a network and installed through the communication apparatus 809, or may be installed from the storage apparatus 808, or may be installed from the ROM 802. When the computer program is executed by the processing apparatus 801, the preceding functions defined in the method of the embodiments of the present disclosure are executed.

It is to be noted that the preceding computer-readable medium in the present disclosure may be a computer-readable signal medium or a computer-readable storage medium or any combination thereof. The computer-readable storage medium may be, but is not limited to, for example, an electronic, magnetic, optical, electromagnetic, infrared or semiconductor system, apparatus or device, or any combination thereof. More specific examples of the computer-readable storage medium may include, but are not limited to, an electrical connection with at least one wire, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus or device. The program codes included on the computer-readable medium may be transmitted via any appropriate medium which includes, but is not limited to, a wire, an optical cable, a radio frequency (RF) or any appropriate combination thereof.

In some embodiments, clients and servers may communicate using any network protocol currently known or to be developed in the future, such as HyperText Transfer Protocol (HTTP), and may be interconnected with any form or medium of digital data communication (such as a communication network). Examples of the communication network include a local area network (LAN), a wide area network (WAN), an internet (such as the Internet) and a peer-to-peer network (such as an Ad-Hoc network), as well as any network currently known or to be developed in the future.

The computer-readable medium may be included in the electronic device or may exist alone without being assembled into the electronic device.

The computer-readable medium carries at least one program which, when executed by the electronic device, causes the electronic device to: acquire target audio data to be synthesized; extract an acoustic feature of the target audio data as a target acoustic feature; determine PPG corresponding to the target audio data according to the target acoustic feature and generate an image sequence corresponding to the target audio data according to the PPG, where the PPG is used to characterize a distribution probability of a phoneme to which each audio frame in the audio data belongs; and perform a video synthesis on the target audio data and the image sequence corresponding to the target audio data to obtain target video data.

Alternatively, the computer-readable medium carries at least one program which, when executed by the electronic device, causes the electronic device to: acquire reference video data, where the reference video data includes reference audio data, a reference image sequence and text data corresponding to the reference audio data; where an image generation model includes a speech recognition sub-model, a GRU and a VAE, where the VAE includes an encoding network and a decoding network; and perform model training in such a manner that an acoustic feature of the reference audio data is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or connected to an external computer (for example, via the Internet using an Internet service provider).

The flowcharts and block diagrams in the drawings show the possible architecture, function and operation of the system, method and computer program product according to various embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which performs specified functions or operations or a combination of special-purpose hardware and computer instructions.

The described modules involved in the embodiments of the present disclosure may be implemented in software or in hardware. The names of the modules do not constitute a limitation on the modules themselves. For example, a first acquisition module may also be described as "a module for acquiring target audio data to be synthesized".

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on at least one wire, a portable computer disk, a hard disk, a random-access memory (RAM), a read-only memory (ROM), an erasable programmable read-only memory (EPROM), a flash memory, an optical fiber, a portable compact disc read-only memory (CD-ROM), an optical storage device, a magnetic storage device, or any appropriate combination thereof.

According to at least one embodiment of the present disclosure, example 1 provides a video generation method. The method includes: acquiring target audio data to be synthesized; extracting an acoustic feature of the target audio data as a target acoustic feature; determining PPG corresponding to the target audio data according to the target acoustic feature and generating an image sequence corresponding to the target audio data according to the PPG, where the PPG is used to characterize a distribution probability of a phoneme to which each audio frame in the audio data belongs; and performing a video synthesis on the target audio data and the image sequence corresponding to the target audio data to obtain target video data.

According to at least one embodiment of the present disclosure, example 2 provides the method in example 1, where determining the PPG corresponding to the target audio data according to the target acoustic feature and generating the image sequence corresponding to the target audio data according to the PPG include: inputting the target acoustic feature into an image generation model so that the PPG corresponding to the target audio data is determined by the image generation model according to the target acoustic feature and generating the image sequence corresponding to the target audio data according to the PPG corresponding to the target audio data.

According to at least one embodiment of the present disclosure, example 3 provides the method in example 1, where the image generation model includes a speech recognition sub-model, a GRU and a decoding network of a VAE connected in sequence, where the speech recognition sub-model is configured to determine the PPG of the audio data according to the input acoustic feature of the audio data; the GRU is configured to determine a feature vector according to the input PPG; and the decoding network is configured to generate the image sequence corresponding to the audio data according to the feature vector.

According to at least one embodiment of the present disclosure, example 4 provides the method in example 3, where the image generation model further includes an encoding network of the VAE; and the image generation model is obtained through the following training: acquiring reference video data, where the reference video data includes reference audio data, a reference image sequence and text data corresponding to the reference audio data; and performing model training in such a manner that an acoustic feature of the reference audio data is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

According to at least one embodiment of the present disclosure, example 5 provides the method in example 4, where the image generation model further includes a discriminator, and the image generation model is a generative adversarial network including a generator and the discriminator, where the generator includes the speech recognition sub-model, the GRU, the decoding network and the encoding network; and the discriminator is configured to perform a true-false determination on the image sequence output by the decoding network at a model training stage, where an obtained true-false determination result is used to update a model parameter of the generator and a model parameter of the discriminator.

According to at least one embodiment of the present disclosure, example 6 provides a training method for an image generation model. The image generation model includes a speech recognition sub-model, a GRU and a VAE, where the VAE includes an encoding network and a decoding network; and the method includes: acquiring reference video data, where the reference video data includes reference audio data, a reference image sequence and text data corresponding to the reference audio data; and performing model training in such a manner that an acoustic feature of the reference audio data is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

According to at least one embodiment of the present disclosure, example 7 provides the method in example 6, where the image generation model further includes a discriminator, and the image generation model is a generative adversarial network including a generator and the discriminator, where the generator includes the speech recognition sub-model, the GRU and the VAE; and the method further includes: inputting, by the decoding network, the obtained image sequence into the discriminator; performing, by the discriminator, a true-false determination on the image sequence obtained by the decoding network; and updating a model parameter of the generator and a model parameter of the discriminator using an obtained true-false determination result.

According to at least one embodiment of the present disclosure, example 8 provides a video generation apparatus. The apparatus includes a first acquisition module, which is configured to acquire target audio data to be synthesized; an extraction module, which is configured to extract an acoustic feature of the target audio data acquired by the first acquisition module as a target acoustic feature; a determination module, which is configured to determine PPG corresponding to the target audio data according to the target acoustic feature extracted by the extraction module and generate an image sequence corresponding to the target audio data according to the PPG, where the PPG is used to characterize a distribution probability of a phoneme to which each audio frame in the audio data belongs; and a synthesis module, which is configured to perform a video synthesis on the target audio data acquired by the first acquisition module and the image sequence corresponding to the target audio data determined by the determination module to obtain target video data.

According to at least one embodiment of the present disclosure, example 9 provides an image generation model training apparatus. The image generation model includes a speech recognition sub-model, a GRU and a VAE, where the VAE includes an encoding network and a decoding network; and the apparatus includes a second acquisition module, which is configured to acquire reference video data, where the reference video data includes reference audio data, a reference image sequence and text data corresponding to the reference audio data; and a training module, which is configured to perform model training in such a manner that an acoustic feature of the reference audio data acquired by the second acquisition module is used as an input of the speech recognition sub-model, the text data corresponding to the reference audio data is used as a target output of the speech recognition sub-model, the reference image sequence is used as an input of the encoding network, the reference image sequence is used as a target output of the decoding network, PPG corresponding to the reference audio data determined by the speech recognition sub-model according to the acoustic feature of the reference audio data is used as an input of the GRU and an output of the encoding network is used as a target output of the GRU to obtain the image generation model.

According to at least one embodiment of the present disclosure, example 10 provides a computer-readable medium, which is configured to store a computer program which, when executed by a processor apparatus, implements the method according to any one of examples 1 to 7.

According to at least one embodiment of the present disclosure, example 11 provides an electronic device. The electronic device includes a storage apparatus, which is configured to store a computer program; and a processing apparatus, which is configured to execute the computer program in the storage apparatus to implement the method according to any one of examples 1 to 5.

According to at least one embodiment of the present disclosure, example 12 provides an electronic device. The electronic device includes a storage apparatus, which is configured to store a computer program; and a processing apparatus, which is configured to execute the computer program in the storage apparatus to implement the method according to example 6 or 7.

Additionally, although operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the subject matter is described in the language specific to structural features and/or methodological logic acts, it is to be understood that the subject matter defined in the appended claims is not necessarily limited to the specific features or acts described above. Conversely, the particular features and acts described above are merely example forms for implementing the claims. As for the apparatus in the preceding embodiments, the specific manner of the execution operation of each module has been described in detail in the embodiments of the method, which will not be described in detail herein.

What is claimed is:

1. A video generation method, comprising:
acquiring target audio data to be synthesized;
extracting an acoustic feature of the target audio data as a target acoustic feature;
determining phonetic posteriorgrams (PPG) corresponding to the target audio data according to the target acoustic feature and generating an image sequence corresponding to the target audio data according to the PPG, wherein the PPG is used to characterize a distribution probability of a phoneme to which each audio frame in the target audio data belongs; and
performing a video synthesis on the target audio data and the image sequence corresponding to the target audio data to obtain target video data,
wherein determining the PPG corresponding to the target audio data according to the target acoustic feature and generating the image sequence corresponding to the target audio data according to the PPG comprise:
inputting the target acoustic feature into an image generation model, determining the PPG corresponding to the target audio data by the image generation model according to the target acoustic feature and generating the image sequence corresponding to the target audio data according to the PPG corresponding to the target audio data;
wherein the image generation model comprises a speech recognition sub-model, a gated recurrent unit (GRU) and a decoding network of a variational autoencoder (VAE) which are connected in sequence; and
wherein the speech recognition sub-model is configured to determine the PPG of the audio data according to the input acoustic feature of the audio data; the GRU is configured to determine a feature vector according to input PPG; and the decoding network is configured to generate the image sequence corresponding to the audio data according to the feature vector.

2. The video generation method according to claim 1, wherein the image generation model further comprises an encoding network of the VAE; and
the image generation model is obtained through the following training:
acquiring reference video data, wherein the reference video data comprises reference audio data, a reference image sequence and text data corresponding to the reference audio data; and
performing model training by using an acoustic feature of the reference audio data as an input of the speech recognition sub-model, using the text data corresponding to the reference audio data as a target output of the speech recognition sub-model, using the reference image sequence as an input of the encoding network, using the reference image sequence as a target output of the decoding network, using PPG corresponding to the reference audio data determined by the speech recognition sub-model according to the acoustic feature of the reference audio data as an input of the GRU and using an output of the encoding network as a target output of the GRU to obtain the image generation model.

3. The video generation method according to claim 2, wherein the image generation model further comprises a discriminator, and the image generation model is a generative adversarial network comprising a generator and the discriminator, wherein the generator comprises the speech recognition sub-model, the GRU, the decoding network and the encoding network; and
the discriminator is configured to perform a true-false determination on an image sequence output by the decoding network at a model training stage to obtain a true-false determination result, wherein the true-false determination result is used to update a model parameter of the generator and a model parameter of the discriminator.

4. A non-transitory computer-readable medium, which is configured to store a computer program which, when executed by a processor, implements the steps of the video generation method according to claim 1.

5. The non-transitory computer-readable medium according to claim 4, wherein the image generation model further comprises an encoding network of the VAE; and
the image generation model is obtained through the following training:
acquiring reference video data, wherein the reference video data comprises reference audio data, a reference image sequence and text data corresponding to the reference audio data; and
performing model training by using an acoustic feature of the reference audio data as an input of the speech recognition sub-model, using the text data corresponding to the reference audio data as a target output of the speech recognition sub-model, using the reference image sequence as an input of the encoding network, using the reference image sequence as a target output of the decoding network, using PPG corresponding to the reference audio data determined by the speech recognition sub-model according to the acoustic feature of the reference audio data as an input of the GRU and using an output of the encoding network as a target output of the GRU to obtain the image generation model.

6. The non-transitory computer-readable medium according to claim 5, wherein the image generation model further comprises a discriminator, and the image generation model is a generative adversarial network comprising a generator and the discriminator, wherein the generator comprises the speech recognition sub-model, the GRU, the decoding network and the encoding network; and the discriminator is configured to perform a true-false determination on an image sequence output by the decoding network at a model training stage to obtain a true-false determination result, wherein the true-false determination result is used to update a model parameter of the generator and a model parameter of the discriminator.

7. An electronic device, comprising:
a memory, which is configured to store a computer program; and
a processor, which is configured to execute the computer program in the memory to implement:
acquiring target audio data to be synthesized;
extracting an acoustic feature of the target audio data as a target acoustic feature;
determining phonetic posteriorgrams (PPG) corresponding to the target audio data according to the target acoustic feature and generating an image sequence corresponding to the target audio data according to the PPG, wherein the PPG is used to characterize a distribution probability of a phoneme to which each audio frame in the target audio data belongs; and
performing a video synthesis on the target audio data and the image sequence corresponding to the target audio data to obtain target video data,
wherein determining the PPG corresponding to the target audio data according to the target acoustic feature and generating the image sequence corresponding to the target audio data according to the PPG comprise:
inputting the target acoustic feature into an image generation model, determining the PPG corresponding to the target audio data by the image generation model according to the target acoustic feature and generating the image sequence corresponding to the target audio data according to the PPG corresponding to the target audio data;
wherein the image generation model comprises a speech recognition sub-model, a gated recurrent unit (GRU) and a decoding network of a variational autoencoder (VAE) which are connected in sequence; and
wherein the speech recognition sub-model is configured to determine the PPG of the audio data according to the input acoustic feature of the audio data; the GRU is configured to determine a feature vector according to input PPG; and the decoding network is configured to generate the image sequence corresponding to the audio data according to the feature vector.

8. The electronic device according to claim 7, wherein the image generation model further comprises an encoding network of the VAE; and
the image generation model is obtained through the following training:
acquiring reference video data, wherein the reference video data comprises reference audio data, a reference image sequence and text data corresponding to the reference audio data; and
performing model training by using an acoustic feature of the reference audio data as an input of the speech recognition sub-model, using the text data corresponding to the reference audio data as a target output of the speech recognition sub-model, using the reference image sequence as an input of the encoding network, using the reference image sequence as a target output of the decoding network, using PPG corresponding to the reference audio data determined by the speech recognition sub-model according to the acoustic feature of the reference audio data as an input of the GRU and using an output of the encoding network as a target output of the GRU to obtain the image generation model.

9. The electronic device according to claim 8, wherein the image generation model further comprises a discriminator, and the image generation model is a generative adversarial network comprising a generator and the discriminator, wherein the generator comprises the speech recognition sub-model, the GRU, the decoding network and the encoding network; and
the discriminator is configured to perform a true-false determination on an image sequence output by the decoding network at a model training stage to obtain a true-false determination result, wherein the true-false determination result is used to update a model parameter of the generator and a model parameter of the discriminator.

10. A training method for an image generation model, wherein the image generation model comprises a speech recognition sub-model, a gated recurrent unit (GRU) and a variational autoencoder (VAE), wherein the VAE comprises an encoding network and a decoding network; and
the training method comprises:
acquiring reference video data, wherein the reference video data comprises reference audio data, a reference image sequence and text data corresponding to the reference audio data; and
performing model training by using an acoustic feature of the reference audio data as an input of the speech recognition sub-model, using the text data as a target output of the speech recognition sub-model, using the reference image sequence as an input of the encoding network, using the reference image sequence as a target output of the decoding network, using phonetic posteriorgrams (PPG) corresponding to the reference audio data determined by the speech recognition sub-model according to the acoustic feature of the reference audio data as an input of the GRU and using an output of the encoding network as a target output of the GRU to obtain the image generation model,
wherein the image generation model further comprises a discriminator, and the image generation model is a generative adversarial network comprising a generator and the discriminator, wherein the generator comprises the speech recognition sub-model, the GRU and the VAE; and
the training method further comprises:
inputting, by the decoding network, an obtained image sequence into the discriminator;
performing, by the discriminator, a true-false determination on the obtained image sequence of the decoding network to obtain a true-false determination result; and
updating a model parameter of the generator and a model parameter of the discriminator using the true-false determination result.

11. An electronic device, comprising:
a memory, which is configured to store a computer program; and
a processor, which is configured to execute the computer program in the memory to implement the training method according to claim 10.

12. A non-transitory computer-readable medium, which is configured to store a computer program which, when executed by a processor, implements the steps of the training method according to claim 10.

\* \* \* \* \*